(12) United States Patent
Wang et al.

(10) Patent No.: US 8,842,558 B2
(45) Date of Patent: Sep. 23, 2014

(54) CONFIGURATION FOR CQI REPORTING IN LTE

(75) Inventors: Jin Wang, Central Islip, NY (US); Erdem Bala, Farmingdale, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 303 days.

(21) Appl. No.: 12/341,383

(22) Filed: Dec. 22, 2008

(65) Prior Publication Data

US 2009/0168718 A1    Jul. 2, 2009

Related U.S. Application Data

(60) Provisional application No. 61/018,505, filed on Jan. 2, 2008.

(51) Int. Cl.
| | | |
|---|---|---|
| *H04L 12/26* | (2006.01) | |
| *H04L 1/00* | (2006.01) | |
| *H04L 5/00* | (2006.01) | |

(52) U.S. Cl.
CPC ............... *H04L 1/0026* (2013.01); *H04L 5/001* (2013.01); *H04L 5/0057* (2013.01)
USPC ........... 370/252; 370/329; 370/328; 455/509; 455/452.1; 455/69

(58) Field of Classification Search
None
See application file for complete search history.

(56) References Cited

U.S. PATENT DOCUMENTS

| | | | |
|---|---|---|---|
| 2003/0228876 A1* | 12/2003 | Hwang | 455/522 |
| 2005/0075869 A1* | 4/2005 | Gersho et al. | 704/223 |
| 2006/0120470 A1* | 6/2006 | Hwang et al. | 375/260 |
| 2007/0026810 A1 | 2/2007 | Love et al. | |
| 2008/0026744 A1* | 1/2008 | Frederiksen et al. | 455/425 |
| 2008/0080469 A1* | 4/2008 | Kolding et al. | 370/342 |
| 2009/0130986 A1 | 5/2009 | Yun et al. | |
| 2010/0054147 A1 | 3/2010 | Ishii | |
| 2010/0074128 A1 | 3/2010 | Ishii | |
| 2010/0260119 A1 | 10/2010 | Kishiyama et al. | |

FOREIGN PATENT DOCUMENTS

| | | |
|---|---|---|
| JP | 2007-043696 A | 2/2007 |
| JP | 2009-089189 A | 4/2009 |
| JP | 2009-529252 A | 8/2009 |
| WO | 2005/089004 | 9/2005 |
| WO | WO 2006/043773 A2 | 4/2006 |
| WO | 07/081564 | 7/2007 |
| WO | 2007/081564 | 7/2007 |
| WO | WO 2007/145495 A1 | 12/2007 |
| WO | WO 2008/105422 A1 | 9/2008 |

OTHER PUBLICATIONS

Motorola, "CQI Reporting", 3GPP TSG-RAN WG2, R2-074655, (Cheju, South Korea, Nov. 5-9, 2007).

Nokia Siemens Networks et al, "Refined Proposal on CQI Compression", TSR RAN WG1 Meeting #50bis, R1-074496, (Shanghai, China, Oct. 8-12, 2007).

(Continued)

*Primary Examiner* — Jackie Zuniga Abad

(74) *Attorney, Agent, or Firm* — Condo Roccia Koptiw LLP

(57) ABSTRACT

A method and apparatus for receiving and processing channel quality index (CQI) reporting. A wireless transmit receive unit is configured to receive CQI configuration information and transmit a CQI report based on the CQI configuration information.

12 Claims, 4 Drawing Sheets

(56) References Cited

OTHER PUBLICATIONS

Third Generation Partnership Project, Technical Specification Group Radio Access Network; Physical Layer Aspects for Evolved Universal Terrestrial Radio Access (UTRA) (Release 7)°, 3GPP TR 25.814, V7.1.0 (Sep. 2006).

Motorola, "CQI Request", 3GPP TSG-RAN WG2, R2-074655, (Cheju, South Korea, Nov. 5-9, 2007).

Nokia Corporaton, et al. "CQI Request", 3GPP TSG-RAN WG2 Meeting #60, R2-074681, (Jeju, South Korea, Nov. 5-9, 2007).

Nokia et al., "DRX Considerations," 3GPP TSG-RAN WG2 Meeting #59, R2-073284 (Aug. 20-24, 2007).

Nokia Siemens Networks et al., "Refined Proposal on CQI Compression", TSR RAN WG1 Meeting #50bis, R1-074496, (Shanghai, China, Oct. 8-12, 2007).

Nortel, "CQI Report in RRC Connection Request", 3GPP TSG RAN WG2 #60, R2-074994, (Jeju, South Korea, Nov. 5-9, 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.2.0 (Sep. 2007).

Third Generation Partnership Project, "Technical Specification Group Radio Access Network; Evolved Universal Terrestrial Radio Access (E-UTRA) and Evolved Univeral Terrestrial Radio Access network (E-UTRAN); Overall Description; Stage 2 (Release 8)", 3GPP TS 36.300, V8.6.0 (Sep. 2008).

Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.4.0 (Dec. 2008).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.0.0 (Dec. 2007).

Third Generation Partnership Project, Technical Specification Group Radio Access Network; Physical Layer Aspects for Evolved Univeral Terrestrial Radio Access (UTRA) (Release 7), 3GPP TR 25.814, V7.1.0 (Sep. 2006).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.6.0 (Sep. 2008).

Third Generation Partnership Project, Technical Specification Group Radio Access Network; Physical Layer Aspects for Evolved Univeral Terrestrial Radio Access (UTRA) (Release 7), 3GPP TR 25.814, V7.1.0 (Sep. 2006).

Third Generation Partnership Project, "Technical Specification Group Radio Access Network; Evolved Universal Terrestrial Radio Access (E-UTRA); Physical layer procedures (Release 8)," 3GPP TS 36.213 V8.1.0 (Nov. 2007).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.5.0 (Dec. 2008).

3rd Generation Partnership Project (3GPP), R1-073746, "On CQI Reporting", Ericsson, 3GPP TSG-RAN WG1 Meeting #50, Athens, Greece, Aug. 20-27, 2007, 4 pages.

* cited by examiner

CONFIGURATION FOR CQI REPORTING IN LTE

CROSS REFERENCE TO RELATED APPLICATION

This application claims the benefit of U.S. provisional application No. 61/018,505, filed Jan. 2, 2008 which is incorporated by reference as if fully set forth.

FIELD OF THE INVENTION

The present disclosure is related to wireless communication systems.

BACKGROUND

The Third Generation Partnership Project (3GPP) has initiated the Long Term Evolution (LTE) program to bring new technology, new network architectures, new configurations and new applications and services to wireless networks in order to provide improved spectral efficiency and faster user experiences.

In LTE, a wireless transmit receive unit (WTRU) may communicate with an eNodeB (eNB). The WTRU may send the eNB certain feedback to give the eNB an indication of the quality of the channel across which the WTRU and eNB are communicating. One particular type of feedback is a channel quality index (CQI) report (hereinafter "CQI"). CQI may be transmitted by the WTRU on a periodic basis or an aperiodic basis. A periodic CQI may be transmitted on the physical uplink control channel (PUCCH) or the physical uplink shared channel (PUSCH). An aperiodic CQI may be transmitted only on the PUSCH.

Three different types of CQI's can be transmitted by a WTRU. A wideband type CQI provides channel quality information of an entire system bandwidth of a cell. A multiband type CQI provides channel quality information for a subset of system bandwidth of the cell. There is also a CQI for multiple input/multiple output (MIMO) type systems.

An LTE compliant WTRU may use PUCCH and PUSCH resources for transmitting CQI. The WTRU may send the CQI on the PUCCH as long as the WTRU maintains synchronization. An eNB may configure the WTRU to transmit wideband or narrowband reports.

SUMMARY

A method and apparatus are disclosed for a WTRU to receive and process CQI reporting configuration information. The WTRU may be configured to receive CQI configuration information and transmit a CQI report based on the CQI configuration information. The configuration information may be received by the WTRU in a radio resource control (RRC) message. The WTRU may receive information elements (IEs) that include specific configuration information.

BRIEF DESCRIPTION OF THE DRAWING

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
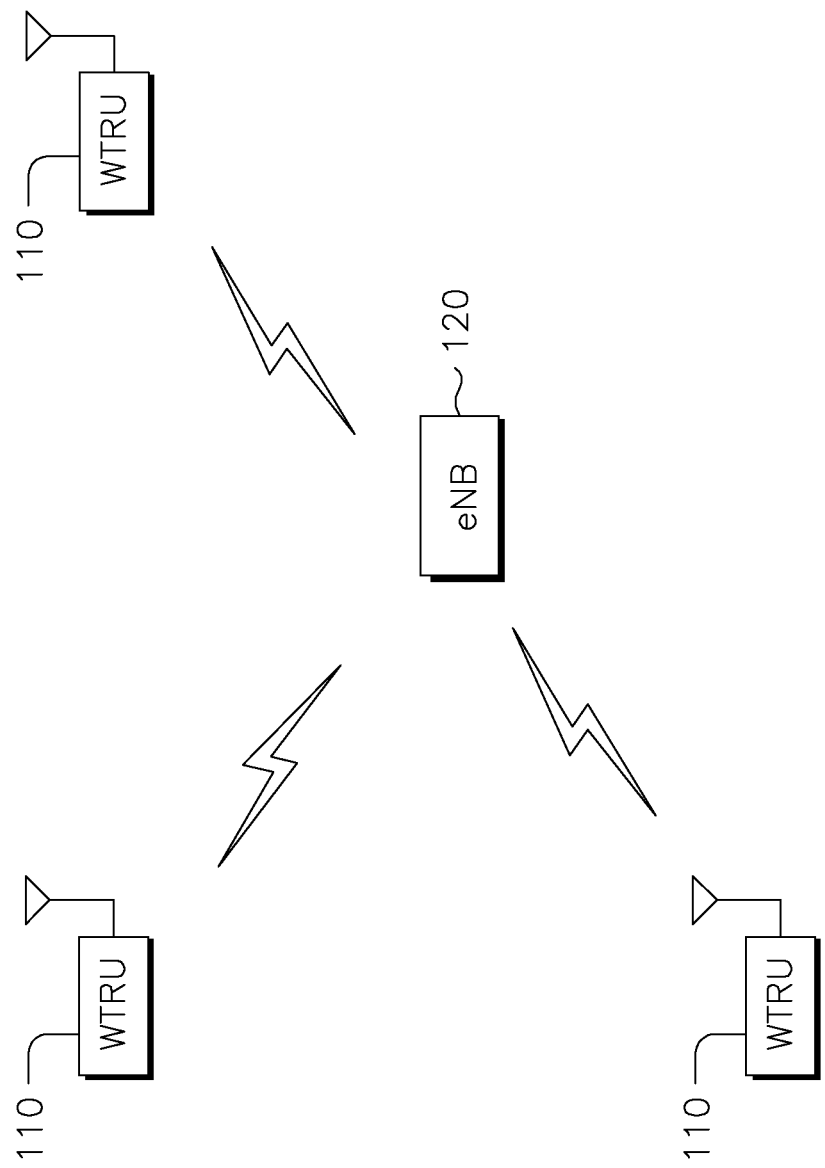
FIG. 1 shows an example wireless communication system including a plurality of wireless transmit/receive units (WTRUs) and an eNodeB in accordance with one embodiment.

FIG. 1 shows a wireless communication system 100 including a plurality of WTRUs 110 and an eNodeB (eNB) 120. As shown in FIG. 1, the WTRUs 110 are in communication with the eNB 120. Although three WTRUs 110 and one eNB 120 are shown in FIG. 1, it should be noted that any combination of wireless and wired devices may be included in the wireless communication system 100.

Figure 2:
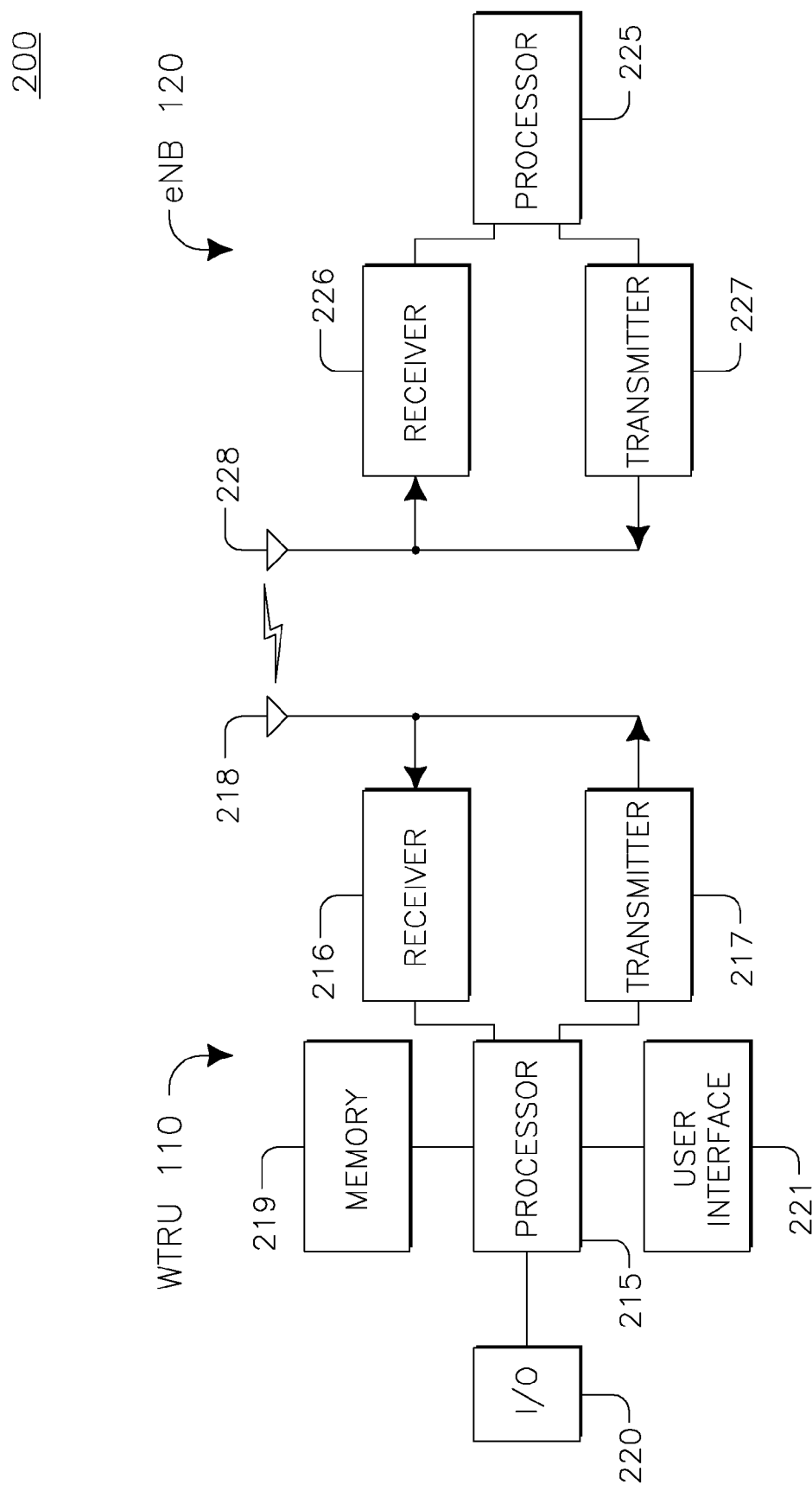
FIG. 2 is a functional block diagram of a WTRU and the eNodeB of FIG. 1 in accordance with one embodiment.

FIG. 2 is a functional block diagram 200 of a WTRU 110 and the base station 120 of the wireless communication system 100 of FIG. 1. As shown in FIG. 1, the WTRU 110 is in communication with the eNB 120. The WTRU 110 is configured to receive instructions and parameters for feedback reporting, including, for example, a CQI, from the eNB 120. The eNB 120 may be configured to transmit, and the WTRU 110 configured to receive and monitor signals on the broadcast channel (BCH). The WTRU 110 may also be configured to receive messages on the BCH, measure CQI, and transmit CQI reports to the eNB (120). The WTRU 110 may transmit on any uplink channel, such as a RACH, for example. The WTRU 110 may be configured to transmit and receive radio resource control (RRC) messages and layer 1 (L1) messages.

In addition to the components that may be found in a typical WTRU, the WTRU 110 includes a processor 215, a receiver 216, a transmitter 217, and an antenna 218. The WTRU 110 may also include a user interface 221, which may include, but is not limited to, an LCD or LED screen, a touch screen, a keyboard, a stylus, or any other typical input/output device. The WTRU 110 may also include memory 219, both volatile and non-volatile, as well as interfaces 220 to other devices, such as universal serial bus (USB) ports, serial ports and the like. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical eNB, the eNB 120 includes a processor 225, a receiver 226, a transmitter 227, and an antenna 228. The receiver 226 and the transmitter 227 are in communication with the processor 225. The antenna 228 is in communication with both the receiver 226 and the transmitter 227 to facilitate the transmission and reception of wireless data.

Figure 3:
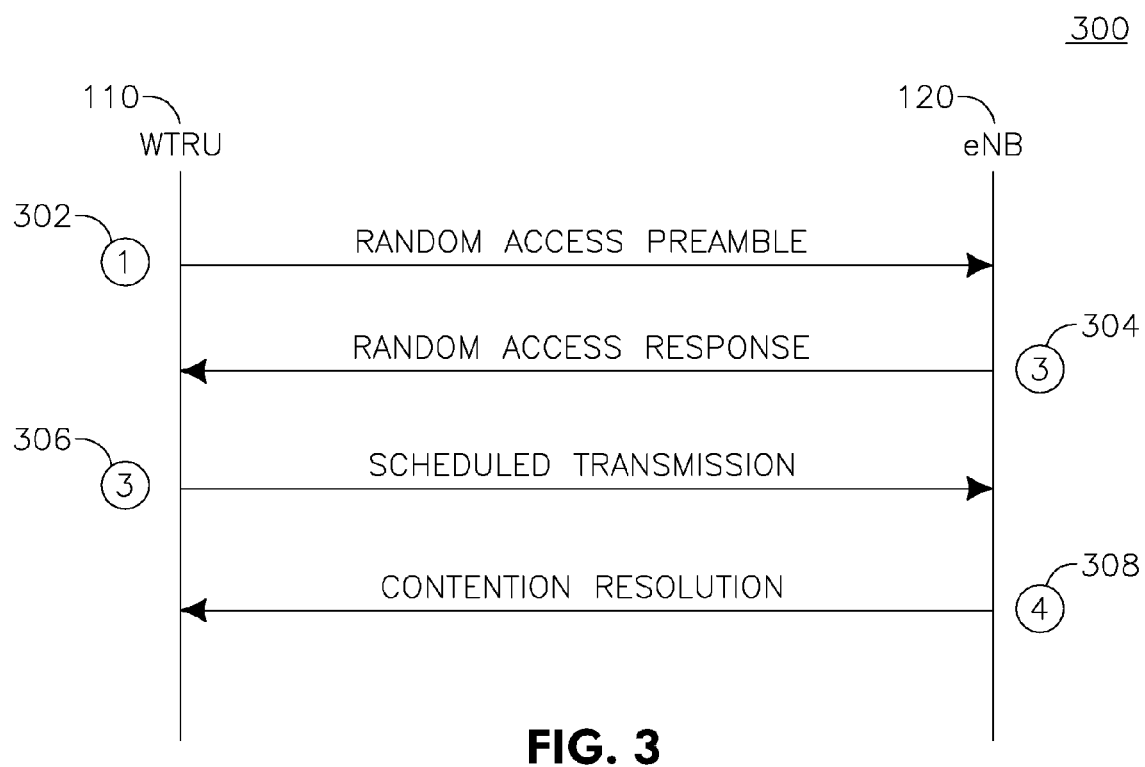
FIG. 3 is a signal diagram of a random access channel (RACH) process in accordance with one embodiment.

When a WTRU begins communicating with an eNB, it may access a shared uplink channel, such as the random access channel. Accessing the RACH is a process that includes multiple messaging between a WTRU and an eNB. This is because the RACH is contentious, and many WTRUs may be attempting to use the RACH at the same time. FIG. 3 shows a RACH process 300 in accordance with one embodiment. The RACH process 300 includes a WTRU (110 of FIG. 1) and an eNB (120 of FIG. 1) communicating four (4) messages to each other. Message 1 (302) is a RACH preamble transmitted by the WTRU. Message 2 (304) is the RACH response, transmitted by the eNB. Message 3 (306) is the RACH scheduled transmission, and message 4 (308) is the contention resolution.

A CQI may be configured during the RACH process 300. The configuration information may be in RACH message 2 (304) or RACH message 4 (308). RACH message 4 (308) can include a relatively large amount of information as compared to the other three messages (302, 304, 306). After the RACH process 300, the WTRU may be reconfigured for either periodic or aperiodic CQI reporting.

A WTRU may receive instructions and parameters to configure a CQI during the RACH process or in an RRC message after the RACH process. CQI report configuration may include, for example, specification of the radio resource and type of CQI report.

A WTRU may require information as to where the CQI report configuration information may be found. The WTRU may receive a broadcast message from an eNB that may include an indication of where the WTRU may look for CQI report configuration information. For example, a broadcast message may include an indication that the WTRU should monitor the RACH to find CQI report configuration information. Alternatively, the broadcast message may include an indication that that the WTRU should receive CQI report configuration information in a radio resource control (RRC) message.

The CQI configuration indication may be found in a downlink channel such as the primary broadcast channel (P-BCH) or the dynamic broadcast channel (D-BCH). The indicator may be as small as one (1) bit. For example, a single bit value of 1 may indicate that the WTRU should use the RACH, and a single bit value of 0 may indicate that the WTRU should use RRC messaging. The location of this indication in the broadcast message may be specified in advance.

A CQI report may include, for example, a number indicating a CQI reporting process, a process ID and a set that includes the total number sub-bands being measured. The set may be denoted as S. The set S may be configured by an eNB. The CQI computations by the WTRU may be done on the set S.

The eNB my configure the CQI report type to be, for example, wideband or selected sub-band. The WTRU may receive an information element (IE) that includes periodic CQI report formatting information. For wideband CQI reporting, a single CQI report is transmitted that may be measured across all the sub-bands in a set S. For selected sub-band CQI reporting, a CQI report may be transmitted that is measured across a subset of set S. The sub-bands selected by the WTRU may be, for example, the sub-bands with the largest signal-to-noise ratio among the sub-bands in set S. This type of CQI reporting is generally reported on the PUSCH. Alternatively, a MIMO type CQI report may include a CQI report for each codeword.

The CQI report may also include a CQI report type. The report type may be represented by, for example, three (3) bits, when there are up to six possible report types. For example, 000 may represent wideband reporting, 001 may represent selected sub-band reporting, and 110 may represent all sub-band reporting. If more than six (6) possible report types are available, four (4) for more bits may be used.

For CQI transmitted by the WTRU on the PUCCH, the eNB may indicate if the WTRU is to use wideband CQI or frequency selective CQI. If using frequency selective CQI, the WTRU may select the sub-bands used for measurement. The selection of the measured sub-bands may be an implicit function of a time index.

For CQI transmitted by the WTRU on the PUSCH, the eNB may signal one of three (3) possible CQI types that the WTRU may use. The eNB may signal that the WTRU may use wideband CQI, selected sub-band CQI or eNB configured CQI.

If selected sub-band CQI is to be configured by the eNB, a compressed label scheme may be used. In this approach, a parameter M may be configured by the eNB, where M is an integer value. M may be smaller than the total number of values the WTRU may use for CQI, and may be used to limit the number of values used by the WTRU for CQI.

If the eNB instructs the WTRU to use eNB configured CQI reporting, the eNB may indicate a differential compression method to be used by the WTRU. The reported CQI value may be a differential with respect to a reference value, such as computing a wideband CQI differentially with respect to neighbouring sub-bands, for example.

Figure 4:
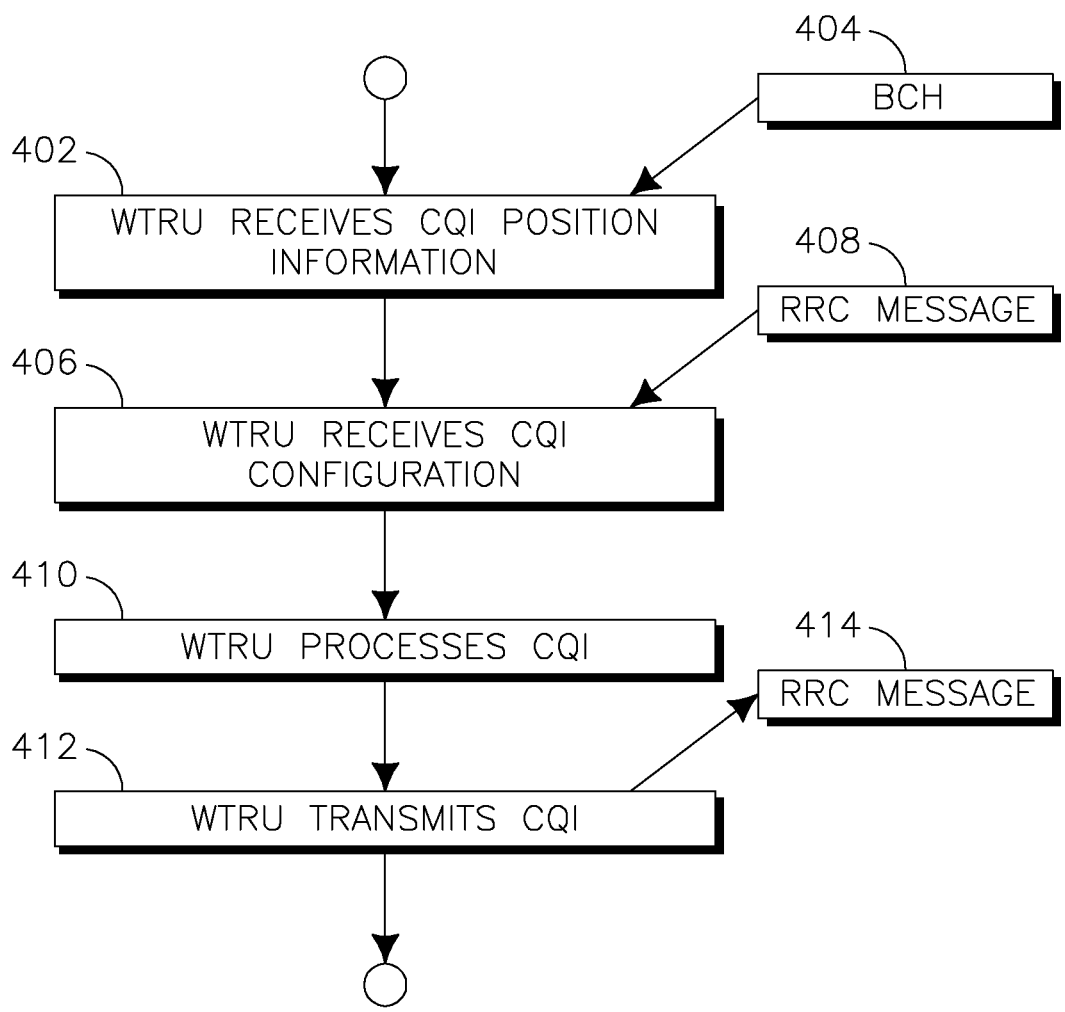
FIG. 4 is a flow diagram of a method of CQI reporting in accordance with one embodiment.

FIG. 4 is a flow diagram of a method of CQI reporting 400 in accordance with one embodiment. At step 402 a WTRU may receive CQI position information that includes where the CQI configuration information may be found by the WTRU. This position information may be transmitted on a shared downlink channel, such as a broadcast channel 404, for example. At step 406, the WTRU may receive the CQI configuration information. This may be located in an RRC message 408. At step 410, the WTRU processes the configuration information, measures for CQI and processes a CQI report. The format of the report may be based on the configuration information. At step 412, the WTRU may transmit the CQI report. The CQI report may be transmitted in an RRC message 414, for example.

Resource allocation may implicitly indicate whether the PUCCH or the PUSCH will be used for CQI reporting. An uplink (UL) resource allocation for CQI reporting may include time, frequency, code resource, duration, periodicity, and start time. The duration may be specified for periodic CQI reporting and the start time may be based on a system frame number (SFN). The resource allocation may be received by the WTRU in an IE. If a MIMO type CQI is requested by the eNB, the eNB may indicate the configuration information for each codeword to the WTRU.

CQI reporting may be reconfigured during operation of a WTRU. The reconfiguration may include, for example, an eNB configuring and/or reconfiguring certain CQI reporting parameters or extending a CQI report before it expires. In addition to using RRC for reconfiguration for CQI reporting, a medium access control (MAC) control protocol data unit (PDU) can also be used.

If the MAC control PDU is to be used for CQI reporting reconfiguration, then one (1) bit can be used in the MAC control PDU header to indicate if CQI reporting reconfiguration is included in the MAC control PDU.

If a specific MAC control PDU is used for CQI reporting, then indication of the CQI reporting MAC control PDU may be placed at the beginning of the PDU and the number of bits used as an indicator may depend on how many different MAC control PDUs exist. For example, if less than 32 different MAC control PDUs exist, then five bits are enough to indicate if this is a CQI reporting reconfiguration.

The position of all information elements for CQI reporting reconfiguration in the MAC control PDU may be fixed prior to the WTRU starting operation so that the WTRU knows what each element represents.

The configuration for aperiodic CQI reporting may transmitted by the eNB to the WTRU when a trigger is received by the eNB. The trigger for aperiodic CQI reporting from the eNB can be a one (1) bit indication. Alternatively, the request can be embedded into codewords in an uplink grant. The eNB may allocate the uplink grant for the WTRU so that the radio resource is available in an uplink shared channel. The configuration message can be RRC, MAC, or layer 1 (L1) control signaling, for example.

The eNB may signal to a WTRU which CQI report type will be used for aperiodic CQI reporting. A single PUSCH sub-frame type report may include a set of CQI values, each of which corresponds to a set of sub-bands. The single PUSCH sub-frame type report may alternatively include a sub-band specific CQI for all sub-bands or a CQI value averaged over multiple sub-bands.

For aperiodic CQI reporting, the eNB may configure the PUSCH resource based on the type of aperiodic CQI report. The control information sent by the eNB may include, for example, the radio frame, timeslot, frequency band, and possible code resource on the PUSCH for aperiodic CQI reporting.

Although the features and elements are described in particular combinations, each feature or element can be used alone without the other features and elements or in various combinations with or without other features and elements. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of channel quality index (CQI) reporting in a wireless transmit receive unit (WTRU), the method comprising:
   receiving CQI reporting configuration information in a radio resource control (RRC) message,
   wherein the CQI reporting configuration information comprises physical uplink control channel (PUCCH) resource information, periodic CQI report information; and an aperiodic CQI report type that is one of wideband, WTRU selected sub-band, or eNodeB configured sub-band;
   receiving a trigger for aperiodic reporting that is a one bit indication embedded in an uplink grant; and
   transmitting a CQI report based on the CQI reporting configuration information in response to receiving the trigger.

2. The method as in claim 1 wherein the RRC message is an information element (IE).

3. The method of claim 1 wherein the periodic CQI report information includes periodicity information.

4. The method of claim 1 wherein the CQI reporting configuration information includes information associated with a multiple-input multiple-output (MIMO) CQI report.

5. The method of claim 1 wherein the CQI report includes a wideband CQI and a differential CQI at least one sub-band.

6. The method of claim 1 further comprising:
   receiving a message that includes resource information for a WTRU to receive the CQI reporting configuration information.

7. A wireless transmit receive unit (WTRU) configured to transmit a channel quality index (CQI) report, the WTRU comprising:
   a receiver configured to receive CQI reporting configuration information in a radio resource control (RRC) message,
   wherein the CQI reporting configuration information comprises physical uplink control channel (PUCCH) resource information, periodic CQI report information; and an aperiodic CQI report type that is one of wideband, WTRU selected sub-band, or eNodeB configured sub-band;
   the receiver further configured to receive a trigger for aperiodic reporting that is a 1 bit indication embedded in an uplink grant; and
   a transmitter configured to transmit a CQI report based on the CQI reporting configuration information in response to the trigger.

8. The WTRU as in claim 7 wherein the RRC message is an information element (IE).

9. The WTRU of claim 7 wherein the periodic CQI report information includes periodicity information.

10. The WTRU of claim 7 wherein the CQI reporting configuration information includes information associated with a multiple-input multiple-output (MIMO) CQI report.

11. The WTRU of claim 7 wherein the CQI report includes a wideband CQI and a differential CQI at least one sub-band.

12. The WTRU of claim 7 wherein the receiver is configured to receive a message that includes resource information for a WTRU to receive the CQI reporting configuration information.

* * * * *